United States Patent [19]
Hoskin et al.

[11] Patent Number: 4,785,028
[45] Date of Patent: Nov. 15, 1988

[54] GELS FOR PROFILE CONTROL IN ENHANCED OIL RECOVERY UNDER HARSH CONDITIONS

[75] Inventors: Dennis H. Hoskin, Lawrenceville; Thomas O. Mitchell, Pennington; Paul Shu, Princeton Junction, all of N.J.

[73] Assignee: Mobil Oil Corporation, New York, N.Y.

[21] Appl. No.: 944,727

[22] Filed: Dec. 22, 1986

[51] Int. Cl.$^4$ .............................................. E21B 43/22
[52] U.S. Cl. ..................................... 523/130; 166/274; 166/295; 252/8.554; 525/328.4
[58] Field of Search ............... 252/8.551, 8.553, 8.554; 523/130; 525/328.4; 166/274

[56] References Cited

U.S. PATENT DOCUMENTS

| | | |
|---|---|---|
| 3,749,172 | 7/1973 | Hessert . |
| 3,908,760 | 9/1975 | Clampitt et al. . |
| 3,918,521 | 11/1975 | Snavely, Jr. et al. . |
| 4,157,322 | 6/1979 | Colegrove ...................... 166/270 X |
| 4,309,523 | 1/1982 | Engelhardt et al. . |
| 4,440,228 | 4/1984 | Swanson . |
| 4,451,631 | 5/1984 | Engelhardt et al. ......... 252/8.554 X |
| 4,461,351 | 7/1984 | Falk ................................. 523/130 X |
| 4,471,097 | 9/1984 | Uhl et al. ...................... 252/8.551 X |
| 4,479,894 | 10/1984 | Chen et al. . |
| 4,489,783 | 12/1984 | Shu . |
| 4,518,745 | 5/1985 | Engelhardt et al. ......... 252/8.551 X |
| 4,565,249 | 1/1986 | Pebdani et al. . |
| 4,569,393 | 2/1986 | Bruning et al. ................ 523/130 X |
| 4,582,452 | 4/1986 | Sabi et al. ...................... 523/130 X |
| 4,624,795 | 11/1986 | Dawson et al. .................. 252/8.553 |
| 4,655,943 | 4/1987 | Elmquist et al. ............. 252/8.553 X |

*Primary Examiner*—Herbert B. Guynn
*Attorney, Agent, or Firm*—Alexander J. McKillop; Michael G. Gilman; Charles A. Malone

[57] ABSTRACT

A composition of matter where a polymer is partially hydrolyzed to form a polymer intermediate which can be gelled. Said polymer intermediate consists of 2-acrylamido-2-methylpropane-3 sulfonate, N-vinyl-N-methyl acetamide, acrylamide, and an alkali metal hydroxide. When cross-linked with a transitional metal ion said polymer intermediate forms a gel suitable for profile control use under harsh conditions. Said gel is exceptionally stable under the hot temperature and saline conditions encountered in profile control usage during a water flood or carbon dioxide oil recovery operation.

15 Claims, No Drawings

GELS FOR PROFILE CONTROL IN ENHANCED OIL RECOVERY UNDER HARSH CONDITIONS

FIELD OF INVENTION

The invention relates to a novel gel for profile control during enhanced oil recovery operations in a subterranean formation.

BACKGROUND OF THE INVENTION

In all secondary and tertiary enhanced oil recovery processes, in which a drive fluid is used to force oil from an injection well to a production well, profile control may be needed to overcome the deleterious effects of formation permeability stratification. When formation permeability inhomogeneity is encountered, injected and driven fluids preferentially travel through the most permeable regions, resulting in low sweep efficiency and bypassing of oil in lower permeability regions. Another problem is that certain injected fluids may be much lighter than the reservoir fluids and so will separate by gravity, rising toward the top of the flowing region and resulting in bypassing of lower regions (gravity override). One commonly employed solution to these problems is to inject a material that will preferentially flow into the more permeable regions (or is selectively introduced into higher regions) but will subsequently impede further flow through them, thus diverting flowing fluids into previously uninvaded regions. Polymer gels, or polymer/gelling agent mixtures that will subsequently gel in situ, can be used.

The enhanced oil recovery techniques of waterflooding, $CO_2$ flooding, miscible or immiscible gas flooding, and steam flooding are of particular interest and importance. Profile control can often improve performance in such processes by reducing the effects of permeability stratification or gravity override. A gel suitable for profile control must be stable enough to continue to impede flow for long periods of time at the reservoir temperature, salinity and pH. There are a variety of materials commercially available for profile control, all of which perform differently and have limitations. Biopolymers such as xanthan gums are unstable above about 140° F. Synthetic polyacrylamides, depending upon their degree of hydrolysis and the nature and amount of other functional groups such as alkyl sulfonate or pyrrolidone, will have a temperature above which they will not be useful at a given salinity.

Therefore, what is needed is an economical gel which can be used for profile control during enhanced oil recovery under the harsh conditions encountered in a subterranean formation.

SUMMARY

This invention is directed to a composition of matter consisting of a terpolymer of 5 to 95% by weight of 2-acrylamido-2-methylpropane-3-sulfonate; 5 to 95% by weight of N-vinyl-N-methyl acetamide; 0 to 80% by weight of acrylamide; and an amount of an alkali metal hydroxide sufficient to form a partially hydrolyzed polymer intermediate which can be gelled. Said polymer intermediate is gelled by organic crosslinking or admixing transition metal ions with said polymer for a time sufficient to form a gel. The gels which are formed are stable under the harsh conditions encountered when producing hydrocarbonaceous fluids from a subterranean formation.

The partially hydrolyzed polymer intermediate when crosslinked with organic crosslinkers or with transition metal ions forms a more thermally stable gel which is useful in producing hydrocarbonaceous fluids from a reservoir containing same and greatly improves the sweep efficiency of driving fluids. Sweep efficiencies are also improved in water flood, steam flood, and carbon dioxide flood processes.

It is therefore an object of this invention to provide for a new use of a known polymer heretofore utilized as an auxiliary in drilling muds.

It is another object of this invention to provide for a partially hydrolyzed polymer intermediate which can be crosslinked to form a gel suitable for profile control in enhanced oil recovery operations.

It is a yet further object of this invention to provide for a substantially stable gel when high temperatures and/or low pH's are encountered in a reservoir.

It is a still yet further object of this invention to provide for a gelation reaction which will proceed in a saline hydrocarbonaceous reservoir environment.

It is yet another object of this invention to provide for an economical gel for use as a profile control agent during enhanced oil recovery operations.

DESCRIPTION OF THE PREFERRED EMBODIMENTS

In the practice of this invention, a terpolymer is partially hydrolyzed to form a polymer intermediate that can be gelled thereby forming a gel suitable for use under the harsh conditions encountered when producing hydrocarbonaceous fluids from a subterranean formation. The terpolymer comprises about 5 to 95% by weight of 2-acrylamido-2-methylpropane-3-sulfonate ("AMPS"); 5 to 95% by weight of N-vinyl-N-methyl acetamide; and 0 to 80% by weight of acrylamide; and an amount of an alkali metal hydroxide sufficient to form a polymer intermediate which can be gelled. A method for making a kindred polymer is disclosed in U.S. Pat. No. 4,309,523 which issued to Engelhardt et al. on Jan. 5, 1982. This patent is incorporated by reference herein.

A polymer preferred for use herein is marketed by American Hoechst Corporation, located in Houston, Tex., and is sold under the trade name Hostadrill 2825. This product is sold as a drilling fluid additive. The polymer intermediate is derived from a terpolymer made, as is preferred, from about 40% by weight of AMPS, 30% by weight of acrylamide, and 30% by weight of N-vinyl-N-methyl acetamide. Said polymer is believed to have a molecular weight of about 1 million. The partially hydrolyzed terpolymer intermediate is obtained by mixing said preferred amounts of polymer with an amount of an alkali metal hydroxide sufficient to make a gel intermediate.

To form the gel intermediate, an alkali metal hydroxide, preferably sodium hydroxide, is refluxed with the terpolymer. As is shown in Table I below, a gellable intermediate is formed when a 10% by weight solution of the terpolymer (Hoechst 2825) is refluxed with 0.2–0.5M sodium hydroxide for about 7 to about 16 hours. As indicated in Table 1, a desired gellable intermediate was not obtained when the terpolymer was refluxed with 0.05M HCl for about 8 to 27 hours. A gellable intermediate was not formed when the terpolymer was refluxed with 0.05M sodium hydroxide for about 8 to about 27 hours.

TABLE I

Polymer 2825 Hydrolysis
Reflux of 10% Polymer in Indicated Medium
Gellation with Cr(III)

| Time, hr | Medium | Viscosity | % Polymer to Gel |
|---|---|---|---|
| 8 | 0.05 M NaOH | retained | will not gel |
| 8 | 0.05 M HCl | decreased | will not gel |
| 27 | 0.05 M NaOH | decreased | will not gel |
| 27 | 0.05 M HCl | decreased | will not gel |
| 7 | 0.2 M NaOH | retained | 5 |
| 16 | 0.2 M NaOH | retained | 2.5 |
| 16 | 0.5 M NaOH | retained | 1.5 |

Once a gellable intermediate has been formed, transition metal ions are added in an amount sufficient to form a gel by crosslinking. Suitable crosslinking agents include polyvalent metal cations such as $Al^{+3}$, $Cr^{+3}$, $Fe^{+3}$, $Sb^{+3}$ and $Zr^{+4}$. Also suitable for crosslinking are multifunctional amines such as diamines. For example, aluminum citrate can be admixed with the polymer or in slugs alternating with polymer slugs. Soluble compounds of $Cr^{+3}$ or $Fe^{+3}$ can be used, or oxidizable compounds of divalent iron such as $FeCl_2$ can be used in conjunction with an oxidant. Amino resins such as melamine/formaldehyde and phenolic resins such as resorcinol/formaldehyde can be used, as can dialdehydes. Phenols or phenolic materials such as lignites can be used. $Cr^{+3}$ ions are particularly preferred for forming gels from said suitably hydrolyzed terpolymer. Chromic nitrate and chromic chloride have also been utilized to form gels. The pH may optionally be adjusted before crosslinking.

Redox systems such as sodium dichromate and sodium bisulfite have been utilized to obtain $Cr^{+3}$ ions. Similar redox systems are described in U.S. Pat. No. 3,749,172 which is hereby incorporated by reference. When forming these gels, $Cr^{+3}$ ions are used in a preferred amount of from about 100–750 ppm. As is understood by those skilled in the art, the amount of $Cr^{+3}$ ions, or other transition metal ions, utilized will vary depending upon the molecular weight of the particular polymer utilized. In any event, said metal should be in an amount sufficient to obtain the desired gelling effect.

Gels resultant from crosslinking of the gellable terpolymer intermediate are formed in a preferred range between about pH 4.5 and pH 8 when forming these gels with $Cr^{+3}$ and in a preferred range between about pH 3 and pH 10 with other crosslinking agents. Gels obtained from said hydrolyzed terpolymer can be formed in fresh water, distilled water and synthetic sea water. These gels have also been formed in 6%, 12%, and 23% by weight of brine solutions which solutions contain 10% by weight of calcium chloride and 90% by weight of sodium chloride.

Temperatures from about ambient to about 250° F. can be used to form these gels. As the temperature increases, gels form faster. When utilized for profile control in waterflooding and carbon dioxide enhanced recovery operations, the gels may be formed in-situ. When employed in said enhanced recovery operations, the gels have exceptional stability at the temperature, salinities, pH's and pressures encountered in the subterranean formations. Table II below indicates the stability of gels obtained from the partially hydrolyzed terpolymer under test conditions.

TABLE II

Profile Control Gels
Partially Hydrolyzed Polymer 2825

| % 2825 | ppm Cr | salinity | deg F. | pH | weeks |
|---|---|---|---|---|---|
| 4.4 | 750 | 0 | 175 | 5.6 | 26 |
| 4.3 | 750 | 0 | 175 | 5.3 | 26 |
| 3.3 | 500 | 0 | 175 | 5.6 | 26 |
| 5 | 750 | sea | 250 | 5.6 | 26 (1) |
| 5 | 750 | 6 | 250 | 5.6 | 26 (2) |
| 5 | 750 | 12 | 250 | 5.6 | 26 (3) |
| 5 | 750 | 23 | 250 | 5.6 | 26 (4) |
| 5 | 750 | sea-23 | 210 | 5.6 | 26 |

All are firm gels with no syneresis except as noted:
(1) Starts becoming loose at 4 weeks; still gel with no syneresis
(2) Syneresis starts at 12 weeks; 20% at 15 weeks
(3) Syneresis starts at 6 weeks; 50% at 15 weeks
(4) Syneresis starts at 6 weeks; 60% at 15 weeks The novel gels of this invention can also be obtained by organic crosslinking as well as by crosslinking with transition metal ions. Crosslinking is discussed in U.S. Pat. No. 4,440,228 which issued to Swanson on Apr. 3, 1984. This patent is hereby incorporated by reference. To accomplish this, said 2825 polymer was refluxed for about 16 hours with a 0.50N NaOH solution at about 100° C. (212° F.) to obtain said partially hydrolyzed polymer intermediate. Said intermediate is then contacted with an organic crosslinker.

In one example, a gel resultant from the partially hydrolyzed intermediate is prepared by combining 5% by weight of said partially hydrolyzed 2825 polymer with about 2.5% by weight of Parez 613, a melamine/formaldehyde resin. Said resin can be purchased from American Cyanamid Co., Wayne, N.J. The pH of the aqueous solution is then adjusted to 3.5. At a temperature of 210° F., gellation occurs in less than about 4 hours. The weight of said partially hydrolyzed 2825 polymer can vary from about 1.0% to about 5% by weight. Weight of the melamine/formaldehyde resin can vary from about 1.0 to about 5% by weight.

In another example, a gel resultant from the partially hydrolyzed intermediate is prepared by combining 5% by weight of said partially hydrolyzed 2825 polymer with about 0.44% by weight resorcinol. To this mixture, 1.48% by weight formaldehyde is added. The pH of the aqueous solution is adjusted to about 3.5. This solution is maintained at a temperature of about 210° F. whereupon gellation occurs within less than about 4 hours. The weight of the partially hydrolyzed 2825 polymer can vary from about 1.0 to about 5.0% by weight. Resorcinol utilized in making this gel can vary in weight from about 0.1% to about 1.5% by weight. The amount of formaldehyde which can be used can vary from about 0.2% to about 2.5% by weight.

Gels formed in either example are preferred for use in carbon dioxide flooding operations when recovering hydrocarbonaceous fluids from a formation. Temperatures used in forming these gels can vary from ambient to about 250° F. As will be understood by those skilled in the art, gellation depends upon the composition of materials used, temperature, and pH. However, these gels will generally form in a few minutes up to about 48 hours.

Where it is desired to obtain increased sweep efficiency, gels of this invention can be used to plug a previously swept portion of a formation. Said gels can be directed to areas of increased porosity by utilization in any of the below methods.

One method where gels of this invention can be utilized is during a waterflooding process for the recovery of oil from a subterranean formation. U.S. Pat. No. 4,479,894, issued to Chen et al., describes one such process. This patent is hereby incorporated by reference in its entirety.

Another method where these gels can be utilized is disclosed in U.S. Pat. No. 3,908,760. This patent describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man made fractures in formations. This patent is hereby incorporated by reference.

Steamflood processes which can be utilized when employing the gels described herein are detailed in U.S. Pat. Nos. 4,489,783 and 3,918,521 issued to Shu and Snavely, respectively. These patents are hereby incorporated by reference.

Gel described herein can also be used in conjunction with a carbon dioxide drive in an oil recovery process to obtain greater sweep efficiency. A suitable process is described in U.S. Pat. No. 4,565,249 which issued to Pebdani et al. This patent is hereby incorporated by reference in its entirety. Increased sweep efficiency can be obtained when the subject gels are used in a carbon dioxide process.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. An aqueous cross-linked gel formed by partially hydrolyzing an aqueous solution of a terpolymer comprising:
   (a)
   (i) 5 to 95% by weight of 2-acrylamido-2-methyl-propane-3-sulfonate;
   (ii) 5 to 95% by weight of N-vinyl-N-methyl acetamide;
   (iii) 0 to 80% by weight of acrylamide where said terpolymer is refluxed with an alkali metal hydroxide in an amount of from about 0.5 to about 5.0% by weight for about 7 to about 16 hours at a temperature of about 100° C. thereby forming a polymer intermediate which can be gelled to form a gel of a size sufficient for profile control; and
   (b) thereafter crosslinking said intermediate with sufficient transition metal ions, melamine/formaldehyde resin or resorcinol/formaldehyde resin, thereby causing said intermediate to form a gel of a size sufficient for profile control.

2. The gel as recited in claim 1 wherein said alkali metal hydroxide comprises sodium hydroxide and potassium hydroxide.

3. The gel as recited in claim 1 wherein said intermediate is crosslinked with $Cr^{+3}$ ions in an amount sufficient to form a gel.

4. The gel as recited in claim 1 wherein said intermediate is crosslinked with about 100 to about 750 ppm of $Cr^{+3}$ ions sufficient to form a gel in a pH environment of about 4.5 to about 8.0 within about 2 minutes to about 48 hours.

5. The gel as recited in claim 1 wherein said intermediate is crosslinked with a transitional metal ion in an amount sufficient to form a gel with fresh water or salt water and which gel can withstand the environment encountered when producing hydrocarbonaceous fluids from a subterranean formation.

6. The gel as recited in claim 1 wherein said intermediate is crosslinked with melamine/formaldehyde resin of about 1.0% to about 5.0% by weight within a pH environment sufficient to form a gel.

7. The gel as recited in claim 1 wherein said intermediate is crosslinked with melamine/formaldehyde resin of about 2.5% by weight within a pH environment of about 3.5 sufficient to form a gel.

8. The gel as recited in claim 1 wherein said intermediate is crosslinked with about 1.48% by weight of formaldehyde and about 0.44% by weight of resorcinol in a pH environment of about 3.5 sufficient to form a gel.

9. An aqueous cross-linked gel formed by partially hydrolyzing an aqueous solution of a terpolymer comprising:
   (a)
   (i) 5 to 95% by weight of 2-acrylamido-2-methyl-propane-3-sulfonate;
   (ii) 5 to 95% by weight of N-vinyl-N-methyl acetamide;
   (iii) 0 to 80% by weight of acrylamide where said terpolymer is refluxed with sodium hydroxide in an amount of from about 0.5 to about 5.0% by weight for about 7 to about 16 hours at a temperature of about 100° C. thereby forming a polymer intermediate which can be gelled; and
   (b) thereafter crosslinking said intermediate with sufficient transition metal ions, melamine/formaldehyde resin or resorcinol/formaldehyde resin, thereby causing said intermediate to form a gel of a size sufficient to plug a previously swept portion of a hydrocarbonaceous fluid containing formation.

10. The gel as recited in claim 9 wherein said intermediate is crosslinked with a transitional metal ion in an amount sufficient to form a gel with fresh water or salt water and which gel can withstand the environment encountered when producing hydrocarbonaceous fluids from a subterranean formation.

11. The gel as recited in claim 9 wherein said intermediate is crosslinked with melamine/formaldehyde resin of about 2.5% by weight within a pH environment of about 3.5 sufficient to form a gel.

12. The gel as recited in claim 9 wherein said intermediate is crosslinked with $Cr^{+3}$ ions in an amount sufficient to form a gel.

13. The gel as recited in claim 9 wherein said intermediate is crosslinked with about 100 to about 750 ppm of $Cr^{+3}$ ions sufficient to form a gel in a pH environment of about 4.5 to about 8.0 within about 2 minutes to about 48 hours.

14. The gel as recited in claim 9 wherein said gel is to be used for profile control to selectively close pores in said formation during a waterflood, steamflood, or carbon dioxide oil recovery process thereby improving sweep efficiency.

15. The gel as recited in claim 9 wherein step (d) said gel is able to withstand the subterranean conditions encountered when producing hydrocarbonaceous fluids from a subterranean formation for at least three months.

* * * * *